United States Patent
Kim et al.

(10) Patent No.: US 9,279,929 B2
(45) Date of Patent: Mar. 8, 2016

(54) BACKLIGHT ASSEMBLY AND DISPLAY DEVICE INCLUDING THE SAME

(71) Applicant: Samsung Display Co., Ltd., Yongin, Gyeonggi-Do (KR)

(72) Inventors: Heugon Kim, Yongin-si (KR); Seul-Gi Kim, Seoul (KR); Jin Seo, Osan-si (KR); Jaejoong Kwon, Suwon-si (KR); Hayoung Lee, Seoul (KR); Sangwoo Ha, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/479,480

(22) Filed: Sep. 8, 2014

(65) Prior Publication Data

US 2015/0234110 A1  Aug. 20, 2015

(30) Foreign Application Priority Data

Feb. 20, 2014 (KR) .................. 10-2014-0019751

(51) Int. Cl.
*F21V 8/00* (2006.01)

(52) U.S. Cl.
CPC ............ *G02B 6/0016* (2013.01); *G02B 6/0036* (2013.01); *G02B 6/0055* (2013.01)

(58) Field of Classification Search
CPC ... G02B 6/0016; G02B 6/0036; G02B 6/0055
See application file for complete search history.

(56) References Cited

U.S. PATENT DOCUMENTS

| | | | | |
|---|---|---|---|---|
| 5,886,759 A * | 3/1999 | Mashino | ................ | G01D 11/28 349/113 |
| 5,961,198 A * | 10/1999 | Hira | .................... | G02B 6/0036 349/65 |
| 6,167,182 A * | 12/2000 | Shinohara | ............ | G02B 6/0036 385/129 |
| 6,480,307 B1 * | 11/2002 | Yang | .................... | G02B 5/0215 349/65 |
| 6,486,931 B1 * | 11/2002 | Ueda | ..................... | G02B 6/0043 349/64 |
| 2004/0125592 A1 * | 7/2004 | Nagakubo | ............ | G02B 6/0036 362/619 |
| 2004/0212757 A1 * | 10/2004 | Lee | ...................... | G02B 6/0038 349/64 |
| 2007/0195553 A1 | 8/2007 | Tsai et al. | | |
| 2010/0157623 A1 | 6/2010 | Tanahashi | | |
| 2012/0294037 A1 * | 11/2012 | Holman | .................. | F21V 5/02 362/609 |

FOREIGN PATENT DOCUMENTS

| | | |
|---|---|---|
| JP | 2000294021 A | 10/2000 |
| JP | 2010107842 A | 5/2010 |
| KR | 1020120015136 A | 2/2012 |
| KR | 1020120035062 A | 4/2012 |
| KR | 1020120125218 A | 11/2012 |

* cited by examiner

*Primary Examiner* — Mary Ellen Bowman
(74) *Attorney, Agent, or Firm* — Cantor Colburn LLP

(57) ABSTRACT

A display device includes a light guide plate which includes a light incident surface, a light exiting surface connected to the light incident surface, and an opposite surface facing the light exiting surface, a light source which faces the light incident surface and is configured to emit a light, a reflective sheet which faces the opposite surface and reflects the light, a first pattern which is unitary with the light guide plate and protruded from the opposite surface, a pressure sensitive adhesive which is on an upper surface of the reflective sheet and contacts the first pattern, and a display panel which is configured to receive the light exiting through the light exiting surface and display an image.

17 Claims, 9 Drawing Sheets

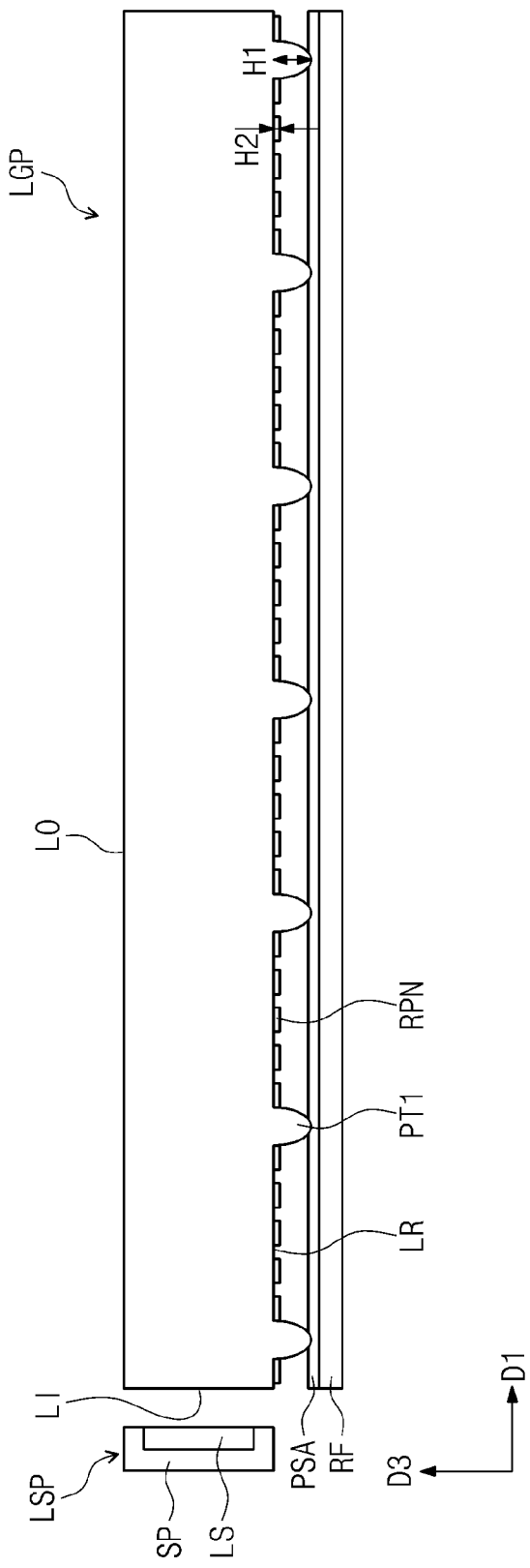

BACKLIGHT ASSEMBLY AND DISPLAY DEVICE INCLUDING THE SAME

This application claims priority to Korean Patent Application No. 10-2014-0019751, filed on Feb. 20, 2014, and all the benefits accruing therefrom under 35 U.S.C. §119, the contents of which are hereby incorporated by reference in its entirety.

BACKGROUND

1. Field

The invention relates to a backlight assembly and a display device including the same.

2. Description of the Related Art

A display device, such as a liquid crystal display ("LCD") device, an electrophoretic display device, etc., includes an LCD panel or an electrophoretic display panel as a display panel to display an image. When the display panels of the display device are not-self emissive, the display device includes a backlight assembly to provide light to the display panel.

The backlight assembly includes plural light sources to emit the light. The light emitted from the light sources is partially lost while being provided to the display panels, and thus an amount of the light incident to the display panels is reduced.

SUMMARY

The invention provides a backlight assembly having improved light efficiency.

The invention provides a display device including the backlight assembly.

Exemplary embodiments of the invention provide a display device including a display panel and a backlight assembly that provides a light to the display panel.

The backlight assembly includes a light guide plate that includes a light incident surface, a light exiting surface connected to the light incident surface, and an opposite surface facing the light exiting surface, a light source which faces the light incident surface and emits the light, a reflective sheet which faces the opposite surface and reflects the light, a first pattern which is unitary with the light guide plate and protruded from the opposite surface, and a pressure sensitive adhesive which is disposed on an upper surface of the reflective sheet and contacts the first pattern. The display panel is configured to receive the light exiting through the light exiting surface to display an image.

In an exemplary embodiment, the first pattern may contact the pressure sensitive adhesive to allow the light guide plate to be spaced apart from the reflective sheet.

In an exemplary embodiment, the first pattern may include a surface of a distal end substantially parallel to the reflective sheet. The first pattern may have a circular column shape, a polygonal column shape, an elliptical cylinder shape, a truncated cone shape, or a truncated polygonal cone shape.

In an exemplary embodiment, the display device may further include a reflective pattern disposed on and protruded from the opposite surface and having a height smaller than a height of the first pattern. The reflective pattern may include a print pattern printed on the opposite surface. The reflective pattern may have a circular shape, an oval shape, or a polygonal shape in a plan view. The reflective pattern may have a hemi-spherical shape, a prism shape, a pyramid shape, a polygonal column shape, an elliptical cylinder shape, a truncated cone shape, or a truncated polygonal cone shape.

In an exemplary embodiment, in a plan view, a density of the reflective pattern per a unit area may increase as a distance from the light incident surface increases.

In an exemplary embodiment, the reflective pattern may have a prism shape or a lenticular shape, which extends in one direction.

In an exemplary embodiment, the first pattern and the reflective pattern may have the same shape but have different sizes.

In an exemplary embodiment, the reflective pattern may include a plurality of concave portions defined in the opposite surface.

In an exemplary embodiment, the display device may further include a second pattern disposed on the light exiting surface to scatter the light traveling to the light exiting surface. In an exemplary embodiment, the second pattern may include protrusions protruded from the light exiting surface of the light guide plate. In an exemplary embodiment, the second pattern may have a prism shape or a lenticular shape, which extends in one direction.

According to the above, the light loss in the backlight assembly may be reduced, and thus the light efficiency of the display device may be improved.

BRIEF DESCRIPTION OF THE DRAWINGS

The above and other advantages of the invention will become readily apparent by reference to the following detailed description when considered in conjunction with the accompanying drawings wherein:

FIG. 3 is a cross-sectional view showing another exemplary embodiment of a display device according to the invention;

DETAILED DESCRIPTION

Figure 1:
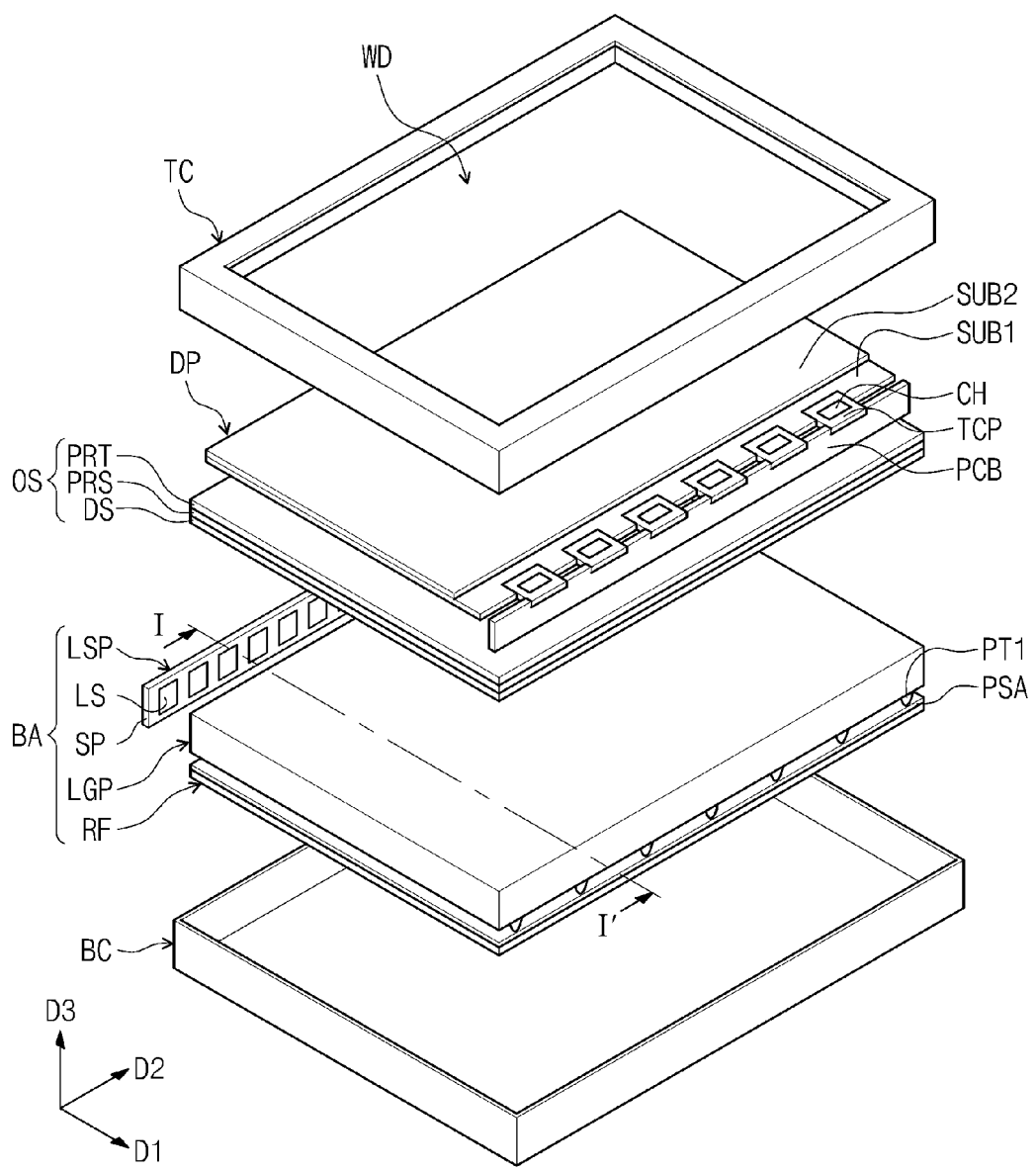
FIG. 1 is an exploded perspective view showing an exemplary embodiment of a display device according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 2:
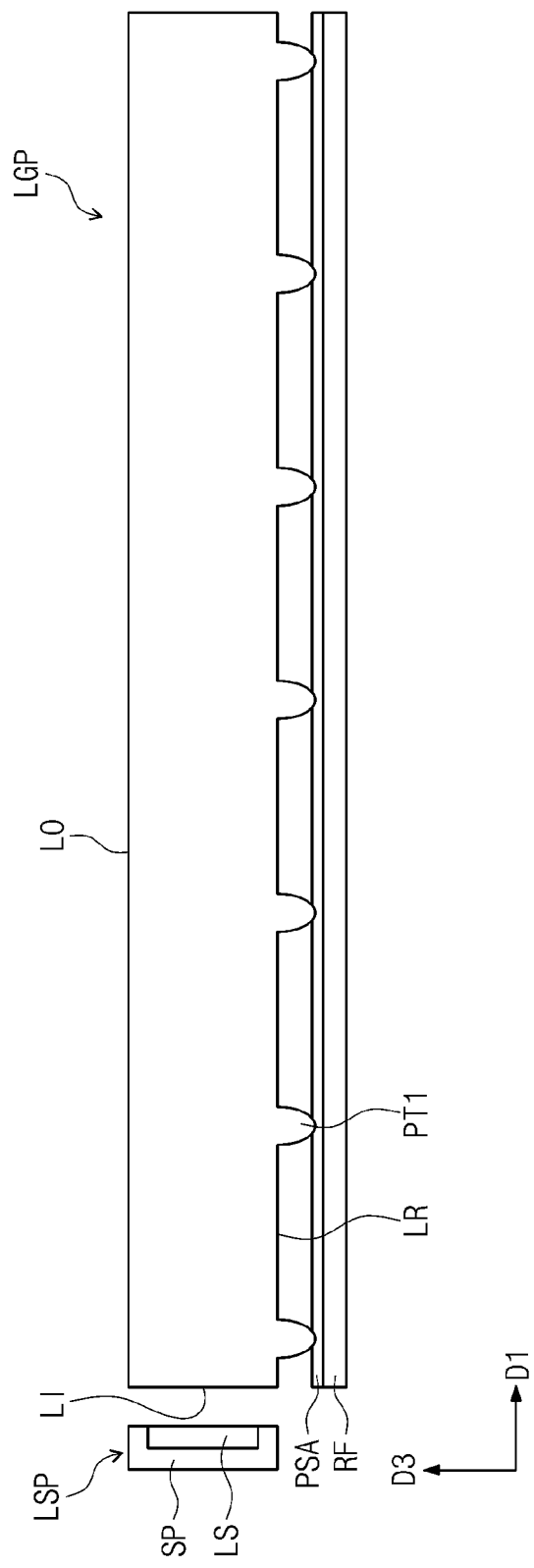
FIG. 2 is a cross-sectional view taken along line I-I' to show a light source part, a light guide plate, and a reflective sheet.

FIG. 1 is an exploded perspective view showing a display device according to an exemplary embodiment of the invention and FIG. 2 is a cross-sectional view taken along line I-I' to show a light source part, a light guide plate, and a reflective sheet.

Referring to FIGS. 1 and 2, the display device includes a backlight assembly BA, a display panel DP, a bottom cover BC, and a top cover TC.

The display panel DP displays an image. The display panel DP is not-self emissive, and thus various display panels, such as a liquid crystal display ("LCD") panel, an electrowetting display panel, an electrophoretic display panel, a microelectromechanical system ("MEMS") display panel, etc., may be used as the display panel DP. In the exemplary embodiment, the LCD panel will be described as the display panel DP.

In the illustrated exemplary embodiment, the display panel DP has a rectangular plate shape with two pairs of sides meeting at right angles, and one of the two pairs of sides is longer than the other, for example. In detail, the display panel DP has the rectangular plate shape with a pair of long sides and a pair of short sides. The short sides extend in a first direction D1, the long sides extend in a second direction D2, and the image is displayed in a third direction D3. However, the invention is not limited thereto, and the display panel DP may various other shapes. In another exemplary embodiment, the display panel DP may include a curved portion, for example.

The display panel DP includes a first substrate SUB1, a second substrate SUB2 facing the first substrate SUB1, and a liquid crystal layer (not shown) interposed between the first substrate SUB1 and the second substrate SUB2.

According to the exemplary embodiment, the first substrate SUB1 includes a plurality of pixel electrodes (not shown) and a plurality of thin film transistors ("TFTs") (not shown) electrically connected to the pixels in a one-to-one correspondence. Each TFT switches a driving signal applied to the corresponding pixel electrode. In an exemplary embodiment, the second substrate SUB2 includes a common electrode (not shown) that generates an electric field in cooperation with the pixel electrodes to control an arrangement of liquid crystal molecules of the liquid crystal layer. In the illustrated exemplary embodiment, the display panel DP operates the liquid crystal molecules of the liquid crystal layer to display the image to a front direction (i.e., an upper vertical direction in a cross section) of the display panel DP.

The display panel DP includes a driving chip CH that applies the driving signal to the display panel DP, a tape carrier package TCP on which the driving chip CH is mounted, and a printed circuit board PCB electrically connected to the display panel DP through the tape carrier package TCP. In FIG. 1, the printed circuit board PCB is disposed to be vertical to the display panel DP, but it should not be limited thereto or thereby. In an exemplary embodiment, the printed circuit board PCB may be disposed on the same plane as the display panel DP or disposed on an outer surface of the bottom cover BC. When the printed circuit board PCB is disposed on the outer surface of the bottom cover BC, the tape carrier package TCP is bent along the outer surface of the bottom cover BC to connect the display panel DP and the printed circuit board PCB. The driving chip CH generates the driving signal to drive the display panel DP in response to an external signal. In an exemplary embodiment, the external signal is provided from the printed circuit board PCB and includes an image signal, various control signals, and a driving voltage.

The backlight assembly BA is disposed under the display panel DP to provide the light to the display panel DP. The backlight assembly BA includes a light source part LSP including light sources to emit the light, a light guide plate LGP guiding the light to the display panel DP, a first pattern PT1 protruded from the light guide plate LGP, optical sheets OS that improves an efficiency of the light, a reflective sheet RF that changes a path in which the light travels, a pressure sensitive adhesive PSA disposed between the first pattern PT1 and the reflective sheet RF, and the bottom cover BC that accommodates the above-mentioned components.

The light source part LSP includes a plurality of light sources LS and a supporter SP that supports the light sources LS. In an exemplary embodiment, the supporter SP may be, but not limited to, a printed circuit board with wirings applying a source voltage to the light sources and controlling the light sources LS. In the illustrated exemplary embodiment, the supporter SP has a rectangular plate shape extended in a predetermined direction, for example.

In an exemplary embodiment, each light source LS may be, but not limited to, a point light source, a line light source, or a surface light source. As an example, the point light source, e.g., a light emitting diode ("LED"), will be described as the light source LS. Illustrated, the LED is provided in a plural number and the LEDs are arranged in a line on the support part SP. The light source LS refers to a minimum light emitting unit, which is able to individually control an amount of the light emitted therefrom. Thus, one light source is configured to include one LED or plural LEDs of which the brightness of the LEDs is substantially simultaneously controlled. In the exemplary embodiment, the light source part LSP includes the support part SP and the light sources LS, but it should not be limited thereto or thereby. That is, in another exemplary embodiment, the support part SP may be omitted. In this case, a separate supporting member to support the light sources LS and/or a separate wiring to apply the source voltage to the light sources are prepared.

The light guide plate LGP is disposed adjacent to one side of the light source part LSP. In the illustrated exemplary embodiment, the light guide plate LGP has a plate shape and is disposed under the display panel DP, for example. In the illustrated exemplary embodiment, the light guide plate LGP has a rectangular parallelepiped shape, for example. Among surfaces of the light guide plate LGP, two widest surfaces (e.g., top and bottom surfaces) are disposed to be substantially parallel to the display panel DP.

The light guide plate LGP includes a light incident surface LI, a light exiting surface LO, and an opposite surface LR.

The light incident surface LI faces the light source part LSP. When the light source part LSP is disposed to face at least one surface of side surfaces that connect the widest two surfaces of the light guide plate LGP, the one surface corresponds to the light incident surface LI. The light emitted from the light source part LSP is incident into the light guide plate LGP through the light incident surface L1.

The light exiting surface LO corresponds to one of the widest two surfaces of the light guide plate LGP and is connected to the light incident surface LI. In the illustrated exemplary embodiment, the light exiting surface LO is a top surface of the light guide plate LGP, for example. The light exiting surface LO faces the display panel DP. The light incident into the light guide plate LGP through the light incident surface LI exits through the light exiting surface LO and travels to the display panel DP.

The opposite surface LR is connected to the light incident surface LI and faces the light exiting surface LO. The opposite surface LR corresponds to the other one of the widest two surfaces of the light guide plate LGP. The light incident through the light incident surface is reflected between the light exiting surface LO and the opposite surface LR while traveling between the light exiting surface LO and the opposite surface LR and exits through the light exiting surface LO to travel to the display panel DP.

In the exemplary embodiment, the display device includes only one light incident surface LI, but the number of the light incident surface LI should not be limited to one. In an exemplary embodiment, plural light source parts may be provided along the side surface of the light guide plate LGP, and in this case, plural light incident surfaces LI exist.

The light guide plate LGP may include a transparent polymer resin, e.g., polycarbonate, polymethacrylate, etc.

The first pattern PT1 includes a plurality of protrusions protruded downward from the opposite surface LR. The first pattern PT1 is disposed between the light guide plate LGP and the reflective sheet RF and serves as a spacer member to allow the light guide plate LGP and the reflective sheet RF to be spaced apart from each other. The first pattern PT1 may be unitary with the light guide plate LGP. In this case, the first pattern PT1 is provided together with the light guide plate LGP when the light guide plate LGP is manufactured. However, the first pattern PT1 may be printed or attached to the opposite surface LR of the light guide plate LGP without being unitary with the light guide plate LGP.

Each protrusion may have various shapes. In the illustrated exemplary embodiment, the protrusion has a hemi-spherical shape, for example, but it should not be limited thereto or thereby. That is, in another exemplary embodiment, a surface of a distal end of the protrusion may be substantially parallel to the reflective sheet RF. Accordingly, in other exemplary embodiments, the protrusion may have a prism or pyramid shape, or various three-dimensional shapes, such as a polygonal column, an elliptical cylinder, a truncated cone shape, a truncated polygonal cone shape, etc. Therefore, the protrusion has a triangular shape, a rectangular shape, or a segment shape when viewed in a plan view, for example.

The protrusions are regularly arranged on the opposite surface LR when viewed in a plan view. In an exemplary embodiment, the protrusions are arranged in a matrix form, but the arrangement of the protrusions should not be limited to the matrix form. The protrusions may be arranged in various shapes according to number, size, and density of the protrusions. In detail, the protrusions are arranged in zigzag fashion or randomly arranged, but the protrusions are provided to minimize the number, size, and density thereof as long as the distance between the light guide plate LGP and the reflective sheet RF is maintained.

The reflective sheet RF is disposed under the light source part LSP to reflect the light leaked from the light source part without being directed to the display panel DP, to thereby allow the light leaked from the light source part to travel to the display panel DP. The reflective sheet RF includes a material that reflects the light. The reflective sheet RF is disposed on the bottom cover BC to reflect the light generated by the light source part LSP. As a result, the amount of the light traveling to the display panel DP is increased by the reflective sheets RF.

The pressure sensitive adhesive PSA is disposed on the reflective sheet RF and includes a transparent material. The pressure sensitive adhesive PSA makes contact with the first pattern PT1 and fixes the reflective sheet RF to the first pattern PT1 such that the reflective sheet RF is not separated from the first pattern PT1. In particular, the pressure sensitive adhesive PSA makes contact with each protrusion. An air layer is disposed between the pressure sensitive adhesive PSA and the light guide plate LGP.

The protrusions of the first pattern PT1 is provided to have a minimized contact area as long as the pressure sensitive adhesive PSA is adhered to the protrusions. Due to the pressure sensitive adhesive PSA, the distance between the light guide plate LGP and the reflective sheet RF is uniformly maintained and the reflective sheet RF is attached to the light guide plate LGP at a proper pressure.

An area, in which the protrusions make contact with the pressure sensitive adhesive PSA, per a unit area may be uniformly maintained such that the light guide plate LGP is uniformly spaced apart from the reflective sheet RF and a uniform adherence pressure is maintained on the entire area between the light guide plate LGP and the reflective sheet RF.

The optical sheet OS is disposed between the light guide plate LGP and the display panel DP. The optical sheet OS controls the light emitted from the light sources LS. The optical sheet OS includes a diffusion sheet DS, a prism sheet PRS, and a protective sheet PRT, which are sequentially stacked on the light guide plate LGP.

The diffusion sheet DS diffuses the light exiting from the light source part LSP. The prism sheet PRS condenses the light diffused by the diffusion sheet DS to allow the light exiting from the diffusion sheet DS to travel in a direction substantially vertical to the display panel DP. The light exiting from the prism sheet PRS is vertically incident into the display panel DP. The protective sheet PRT is disposed on the prism sheet PRS to protect the prism sheet PRS from external impacts.

In the illustrated exemplary embodiment, the optical sheet OS is configured to include one diffusion sheet DS, one prism sheet PRS, and one protective sheet PRT, but the invention should not be limited thereto or thereby. That is, in another exemplary embodiment, at least one of the diffusion sheet DS, the prism sheet PRS, and the protective sheet PRT of the optical sheet OS may be provided in plural number, or one or more of the diffusion sheet DS, the prism sheet PRS, and the protective sheet PRT may be omitted from the optical sheet OS.

The bottom cover BC is disposed under the backlight assembly BA to accommodate the components of the backlight assembly BA. The bottom cover BC has a shape corresponding to that of the reflective sheet RF.

The top cover TC is disposed on the display panel DP. The top cover TC supports a front edge of the display panel DP and covers the side surface of the bottom cover BC. The top cover TC is provided with a display window WD defined therethrough to expose a display area of the display panel DP.

The display device having the above-described structure may reduce a light loss, and thus display the image with high brightness. In particular, the first pattern PT1 has a function to reduce the light loss in addition to a function to maintain the distance between the light guide plate LGP and the reflective sheet RF.

In a conventional display device, the entire opposite surface of the light guide plate faces the reflective sheet and the pressure sensitive adhesive is disposed between the opposite surface of the light guide plate and the reflective sheet. Accordingly, the light traveling to a lower direction of the opposite surface sequentially passes through the opposite surface, the pressure sensitive adhesive, the reflective sheet, the pressure sensitive adhesive, and the opposite surface. The light is absorbed by the pressure sensitive adhesive and the reflective sheet while traveling through the above-mentioned components. The amount of the light loss caused by the pressure sensitive adhesive corresponds to about 20 percent (%) of the light incident into the light guide plate through the light incident surface.

According to the exemplary embodiment, however, the pressure sensitive adhesive PSA is connected to the light guide plate LGP through the first pattern PT1, but the area in which the pressure sensitive adhesive PSA makes contact with the light guide plate LGP is minimized and the air layer is disposed between the opposite surface and the reflective sheet RF, thereby minimizing the light loss. Due to the difference in density between the light guide plate and the air layer, the amount of the light traveling to the reflective sheet RF from the opposite surface is decreased, and most of the light is reflected by the opposite surface toward the light guide plate LGP. In an exemplary embodiment, when the first pattern PT1 is unitary with the light guide plate, the light loss occurring at an interface between the first pattern PT1 and the light guide plate is reduced. Therefore, the light loss is reduced between the light guide plate LGP and the reflective sheet RF and the amount of the light traveling to the display panel DP is increased, thereby improving the brightness of the light displayed through the display panel DP.

According to the illustrated exemplary embodiment, since the reflective sheet RF is attached to the light guide plate LGP by the first pattern PT1 and the pressure sensitive adhesive PSA, the reflective sheet RF and the light guide plate LGP may be regarded as one classified item. Thus, the assembly of the backlight assembly BA is simplified, and defects, e.g., misalignment, occurring when the reflective sheet RF and the light guide plate LGP are not fixed to each other are prevented.

FIG. 3 is a cross-sectional view showing a display device according to another exemplary embodiment of the invention.

Referring to FIG. 3, a light guide plate LGP includes a reflective pattern RPN disposed on the opposite surface LR and having a height different from that of the first pattern PT1.

The reflective pattern RPN may include protrusions having various heights from the opposite surface LR. In the exemplary embodiment, the first pattern PT1 has a first height H1 and the reflective pattern RPN has a second height H2, but the height of the reflective pattern RPN should not be limited to the second height H2. In an exemplary embodiment, the reflective pattern RPN may have three kinds of sub-patterns having different heights.

As shown in FIG. 3, the first pattern PT1 is configured to include protrusions protruded downward from the opposite surface LR and each protrusion has the first height H1. The first pattern PT1 is disposed between the light guide plate LGP and the reflective sheet RF and serves as a spacer member that allows the light guide plate LGP to be spaced apart from the reflective sheet RF.

The reflective pattern RPN includes protrusions protruded downward from the opposite surface LR. The protrusions of the reflective pattern RPN are arranged at regular intervals. The second height H2 of the reflective pattern RPN is smaller than the first height H1 of the first pattern PT1, and thus the reflective pattern RPN is spaced apart from the reflective sheet RF and the pressure sensitive adhesive PSA in areas in which the reflective pattern RPN is provided. Accordingly, an air layer exists between the reflective pattern RPN and the pressure sensitive adhesive PSA.

In an exemplary embodiment, when the surface of the light guide plate LGP is a mirror surface, a total reflection phenomenon of the light occurs. In this case, when the reflective pattern RPN is disposed on the opposite surface LR of the light guide plate LGP, the light is reflected by the reflective pattern RPN, and thus a path of the light is changed to the light exiting surface LO. In the exemplary embodiment, since the light is diffused and reflected by the reflective pattern RPN, a uniformity of the light traveling in the front direction, i.e., the third direction D3, is improved.

In an exemplary embodiment, the reflective pattern RPN may be a printed pattern. In an exemplary embodiment, the reflective pattern RPN may have a circular shape, an oval shape, or a polygonal shape, for example, when viewed in a plan view. In the illustrated exemplary embodiment, the reflective pattern RPN may have the circular shape when viewed in a plan view.

However, the shape of the reflective pattern RPN should not be limited thereto or thereby. In an exemplary embodiment, each protrusion of the reflective pattern RPN may have various three-dimensional shapes, e.g., a hemi-spherical shape, a pyramid shape, a polygonal column, an elliptical cylinder, a prism, a truncated cone shape, a truncated polygonal cone shape, etc. Therefore, each protrusion of the reflective pattern RPN has a triangular shape, a rectangular shape, or a segment shape, for example, when viewed in a plan view. In an exemplary embodiment, each protrusion of the reflective pattern RPN may extend in a first direction D1 or a second direction D2 (refer to FIG. 1) which is vertical to the first and third directions D1 and D3. In this case, each protrusion of the reflective pattern RPN may have a prism or lenticular shape.

The protrusions of the reflective pattern RPN are arranged on the opposite surface LR at regular intervals when viewed in a plan view. In an exemplary embodiment, the protrusions are arranged in a matrix form, but the arrangement of the protrusions should not be limited to the matrix form. In other exemplary embodiments, the protrusions of the reflective pattern RPN may be arranged in various shapes according to number, size, and density of the protrusions. In detail, the protrusions may be arranged in zigzag fashion or randomly arranged, for example, but the protrusions are provided to minimize the number, size, and density thereof as long as the distance between the light guide plate LGP and the reflective sheet RF is maintained.

FIGS. 4A to 4D are plan views showing an opposite surface of a light guide plate and an arrangement of reflection pattern. For the convenience of explanation, the first pattern has been omitted in FIGS. 4A to 4D.

Figure 4A:
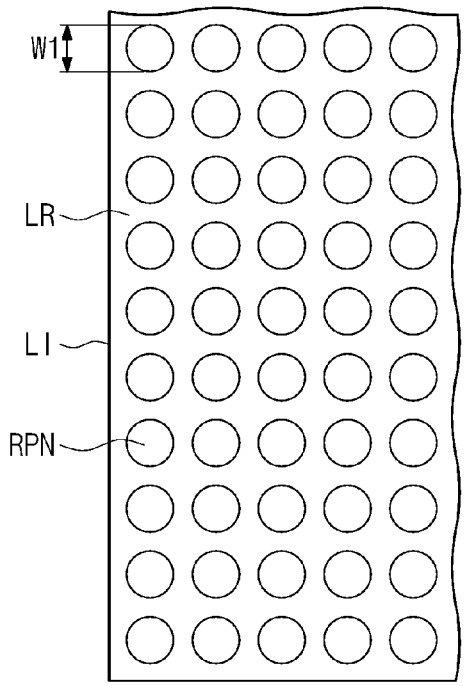
FIGS. 4A to 4D are plan views showing an opposite surface of a light guide plate and an arrangement of reflection pattern.

Referring to FIG. 4A, the protrusions of the reflective pattern RPN are arranged in a matrix form. In the illustrated exemplary embodiment, the protrusions are arranged at regular intervals along the row and column directions and each protrusion has a constant width W1 taken along a vertical direction in a plan view. In an exemplary embodiment, when the protrusion has a circular shape in a plan view, the constant width W1 may be a diameter of a circle.

Figure 4B:
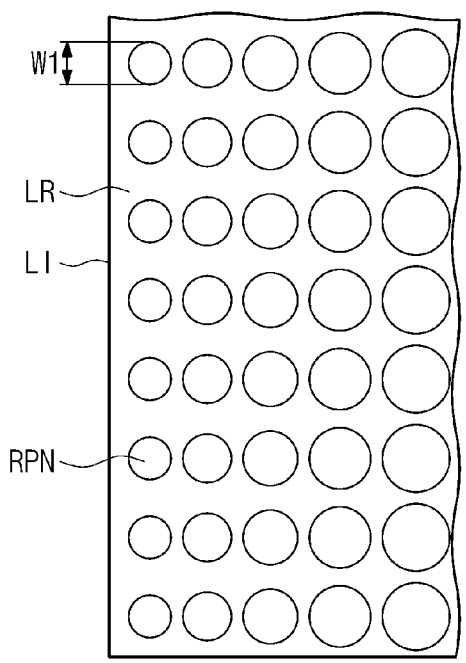

Referring to FIG. 4B, the protrusions of the reflective pattern RPN are arranged in the matrix form, but the width W1 of the protrusions becomes increases as a distance from the light incident surface LI increases. In this case, center portions of the protrusions are arranged at regular intervals along the row and column directions.

Figure 4C:
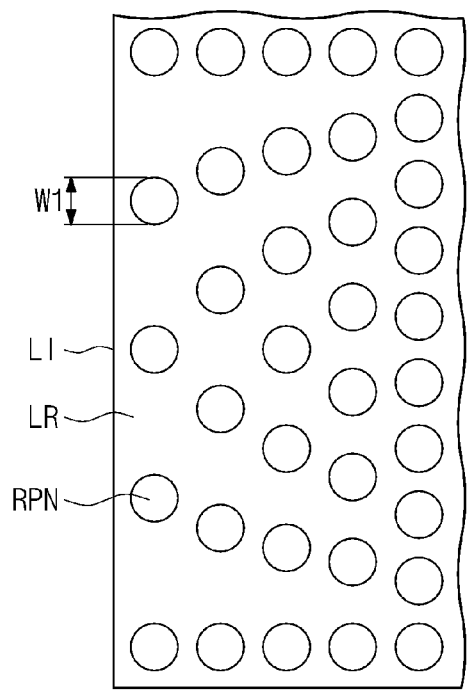

Referring to FIG. 4C, the protrusions of the reflective pattern RPN are randomly arranged without being arranged in the matrix form. However, the number of the protrusions per a unit square increases as the distance from the light incident surface LI increases. In this case, each of the protrusions has the same width W1.

Figure 4D:
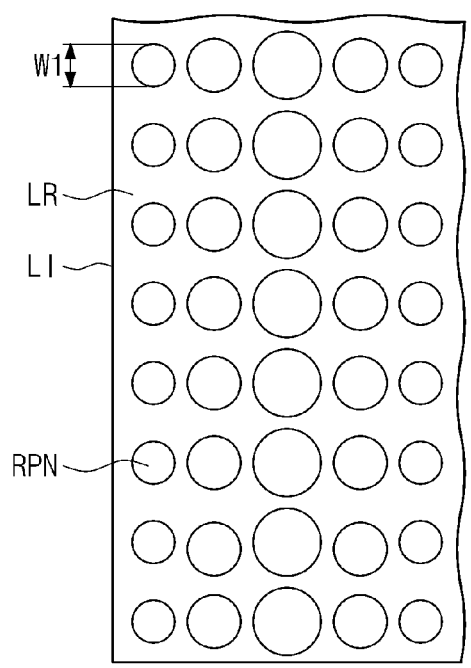

Referring to FIG. 4D, the protrusions of the reflective pattern RPN are arranged in the matrix form, but the protrusions of the reflective pattern RPN may have different widths. In detail, the width W1 of the protrusions increases from the light incident surface LI to a center portion of the opposite surface LR, and decreases from a center portion of the opposite surface LR to an opposite side of the opposite surface LR facing the surface LI.

As shown in FIGS. 4A to 4D, the reflective patterns may have various shapes. Accordingly, since the reflection probability of the light in the entire surface of the opposite surface LR by the reflective patterns RPN and the light efficiency increases regardless of the distance from the light incident surface LI, the brightness of the light may be uniformly maintained over the entire surface of the light guide plate LGP.

Figure 5:
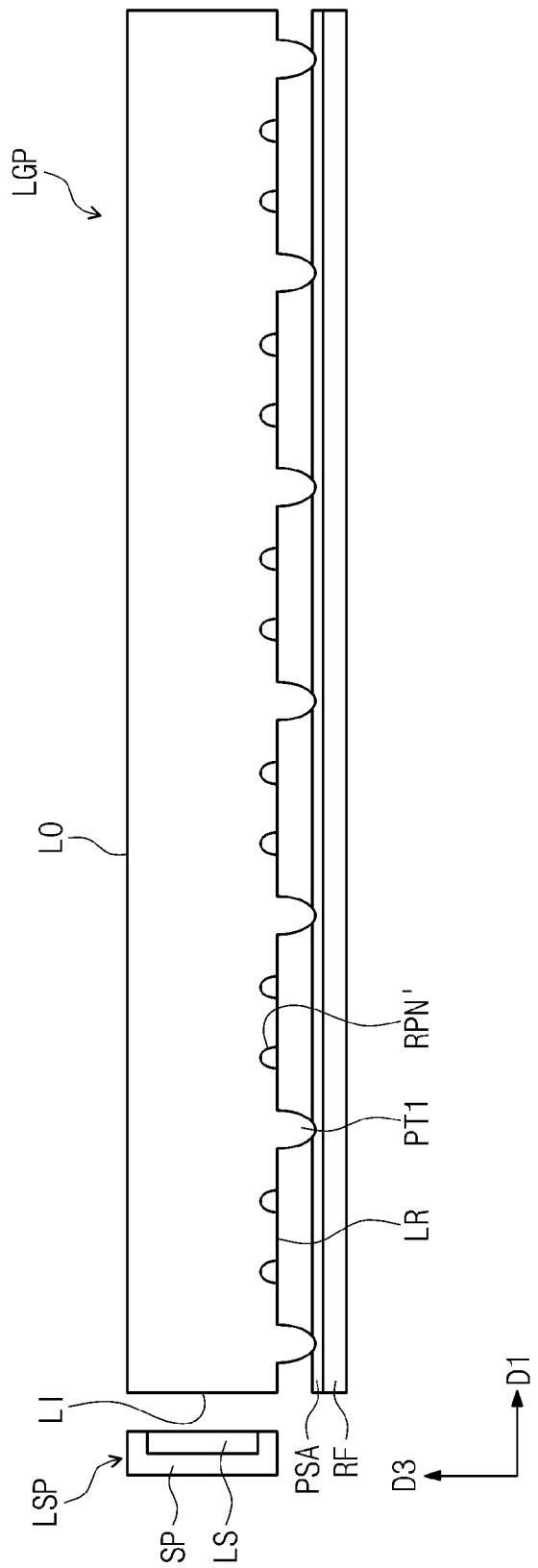
FIG. 5 is a cross-sectional view showing another exemplary embodiment of a display device according to the invention.

FIG. 5 is a cross-sectional view showing a display device according to another exemplary embodiment of the invention.

Referring to FIG. 5, a first pattern PT1 and a reflective pattern RPN', which have different heights from each other, are disposed on the opposite surface LR of the light guide plate LGP. In an exemplary embodiment, the reflective pattern RPN' may be a concave portion defined by partially removing the light guide plate LGP.

The shape of the concave portion may be various three-dimensional shapes, e.g., a pyramid shape, a polygonal column shape, an elliptical cylinder shape, a prism shape, a truncated cone shape, a truncated polygonal cone shape, etc. Therefore, the concave portion has a triangular shape, a rectangular shape, or a segment shape, for example, when viewed in a plan view. In the reflective pattern RPN', the concave portion may extend in the first direction D1 or the second direction D2 (refer to FIG. 1) which is vertical to the first and third directions D1 and D3. In this case, the concave portion of the reflective pattern RPN' may have a prism or lenticular shape, for example.

Figure 6:
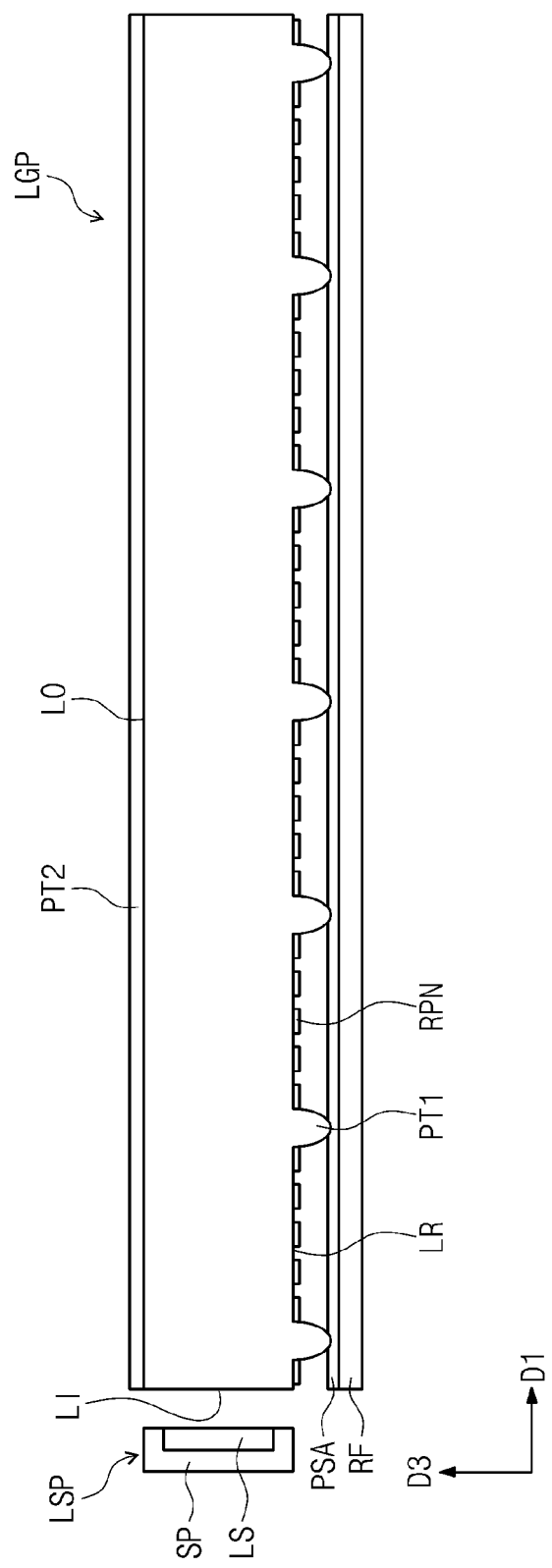
FIG. 6 is a cross-sectional view showing another exemplary embodiment of a display device according to the invention.
Figure 7:
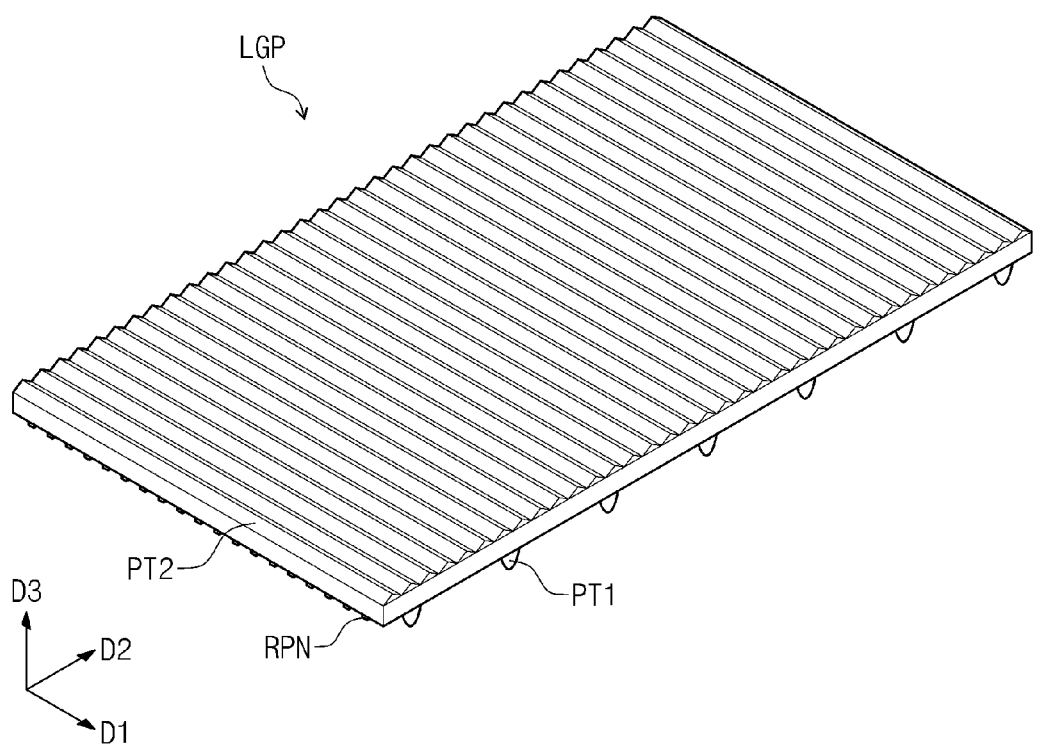
FIG. 7 is a perspective view showing a light guide plate, a first pattern, a reflection pattern, and a second pattern shown in FIG. 6.

FIG. 6 is a cross-sectional view showing a display device according to another exemplary embodiment of the invention and FIG. 7 is a perspective view showing a light guide plate, a first pattern, a reflection pattern, and a second pattern shown in FIG. 6.

Referring to FIGS. 6 and 7, the light guide plate LGP may further include a second pattern PT2 disposed on the light exiting surface LO. The second pattern PT2 may be unitary with the light guide plate LGP without being separated.

The second pattern PT2 allows the light exiting from the light exiting surface LO to uniformly travel in a direction substantially vertical to the light exiting surface LO. In the illustrated exemplary embodiment, the second pattern PT2 includes a plurality of protrusions protruded from the light exiting surface LO such that the light travels in the vertical direction to the light exiting surface LO, and extends in a first direction D1. However, the direction in which the protrusions of the second pattern PT2 extend should not be limited to the first direction D1. That is, in another exemplary embodiment, the protrusions of the second pattern PT2 may extend in the second direction D2. In an exemplary embodiment, each protrusion of the second pattern PT2 has a triangular shape, e.g., an isosceles triangle, a scalene triangle, etc., when viewed in a cross-sectional view with respect to the direction in which the protrusions of the second pattern PT2 extend. However, the shape of the protrusions of the second pattern PT2 should not be limited to the triangular shape.

Although not shown in figures, when the reflective pattern RPN has the prism shape extending in the first direction D1 or the second direction D2, the second pattern PT2 extends in a direction substantially vertical to the direction in which the second pattern PT2 extends.

Figure 8:
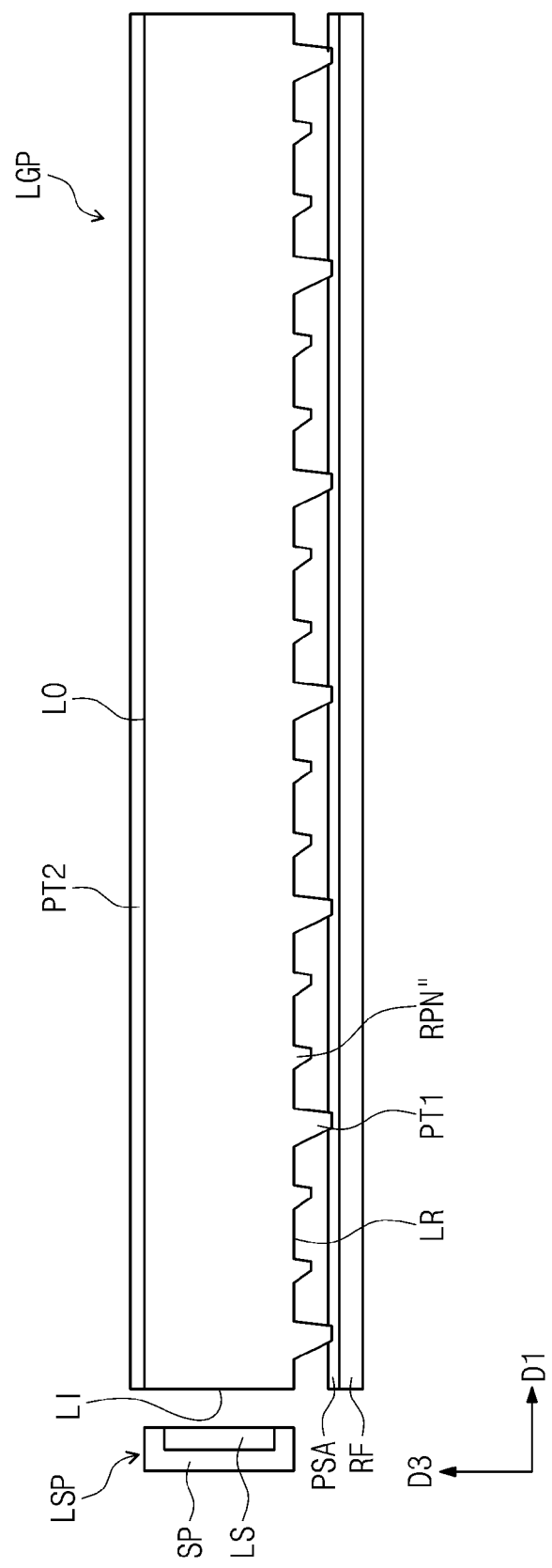
FIG. 8 is a cross-sectional view showing another exemplary embodiment of a display device according to the invention.

FIG. 8 is a cross-sectional view showing a display device according to another exemplary embodiment of the invention.

Referring to FIG. 8, the display device includes a light guide plate LGP, a first pattern PT1 disposed on the opposite surface LR of the light guide plate LGP, a second pattern PT2 disposed on the light exiting surface LO of the light guide plate LGP, and a reflective pattern RPN" disposed on the opposite surface LR. The first pattern PT1 and the reflective pattern RPN" have the same shape but have different sizes. In the illustrated exemplary embodiment, a size of the reflective pattern RPN" is smaller than that of the first pattern PT1. In an exemplary embodiment, the first pattern PT1 and the reflective pattern RPN" have a trapezoid shape when viewed in the first direction D1 or the second direction D2. In this case, an angle between an oblique side of the trapezoid and the opposite surface LR of the light guide plate LGP may be varied depending on a size of the light guide plate LGP and a position of the light source.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a light guide plate which includes a light incident surface, a light exiting surface connected to the light incident surface, and an opposite surface facing the light exiting surface;
    a light source which faces the light incident surface and is configured to emit a light;
    a reflective sheet which faces the opposite surface and reflects the light;
    a first pattern which is unitary with the light guide plate and protruded from the opposite surface;
    a pressure sensitive adhesive which is disposed on an upper surface of the reflective sheet and contacts the first pattern; and
    a display panel which is configured to receive the light exiting through the light exiting surface and display an image.

2. The display device of claim 1, wherein the light guide plate is spaced apart from the reflective sheet by the first pattern.

3. The display device of claim 2, wherein
    a surface of a distal end of the first pattern is substantially parallel to the reflective sheet.

4. The display device of claim 3, wherein the first pattern has a circular column shape, a polygonal column shape, an elliptical cylinder shape, a truncated cone shape, or a truncated polygonal cone shape.

5. The display device of claim 1, further comprising a reflective pattern disposed on and protruded from the opposite surface and having a height smaller than a height of the first pattern.

6. The display device of claim 5, wherein the reflective pattern includes a print pattern printed on the opposite surface.

7. The display device of claim 6, wherein the reflective pattern has a circular shape, an oval shape, or a polygonal shape in a plan view.

8. The display device of claim 5, wherein the reflective pattern has a hemi-spherical shape, a prism shape, a pyramid shape, a polygonal column shape, an elliptical cylinder shape, a truncated cone shape, or a truncated polygonal cone shape.

9. The display device of claim 5, wherein a density of the reflective pattern per a unit area increases as a distance from the light incident surface increases in a plan view.

10. The display device of claim 5, wherein the reflective pattern has a prism shape or a lenticular shape, which extends in one direction.

11. The display device of claim 5, wherein
    a shape of the first pattern is the same as a shape of the reflective pattern, and
    a size of the shape of the first pattern is different from a size of the shape of the reflective pattern.

12. The display device of claim 1, further comprising a reflective pattern including a plurality of concave portions defined in the opposite surface.

13. The display device of claim 1, further comprising a second pattern which is disposed on the light exiting surface and scatters the light traveling to the light exiting surface.

14. The display device of claim 13, wherein the second pattern comprises protrusions protruded from the light exiting surface of the light guide plate.

15. The display device of claim 14, wherein the second pattern has a prism shape or a lenticular shape, which extends in one direction.

16. The display device of claim 1, wherein the reflective sheet comprises a metal material.

17. A backlight assembly comprising:
    a light guide plate which includes:
        a light incident surface;
        a light exiting surface connected to the light incident surface; and
        an opposite surface facing the light exiting surface;
    a light source which is configured to face the light incident surface and emit a light;
    a reflective sheet which faces the opposite surface and reflects the light;
    a protrusion which is unitary with the light guide plate and protruded from the opposite surface; and
    a pressure sensitive adhesive which is disposed on an upper surface of the reflective sheet and contacts the protrusion.

* * * * *